Jan. 14, 1947.   W. B. KIRKPATRICK   2,414,264
APPARATUS FOR MAKING ICE
Filed April 3, 1945   5 Sheets-Sheet 1

INVENTOR.
BY WILLIS B. KIRKPATRICK
D. Malcolm
ATTORNEY

INVENTOR.
WILLIS B. KIRKPATRICK
BY D. Malcolm
ATTORNEY

Patented Jan. 14, 1947

2,414,264

UNITED STATES PATENT OFFICE 2,414,264

APPARATUS FOR MAKING ICE

Willis B. Kirkpatrick, Scarsdale, N. Y.

Application April 3, 1945, Serial No. 586,350

12 Claims. (Cl. 62—106)

This invention relates to the manufacture of ice and has for its principal object to provide a novel and improved apparatus for making ice cubes economically and in large volume.

Another object of the invention is to provide a machine for automatically producing ice cubes of uniform size with flat square tops and in a form clear enough to be readily merchantable.

Another object is to provide an ice cube machine which freezes the cubes in individual compartments, thaws the ice cubes from the walls of said compartments, and automatically discharges them onto a delivery chute or conveyor, with a minimum of maintenance and supervision.

Still another object is to provide an ice cube machine of the foregoing type having novel and improved details of construction and features of operation.

Ice cubes which are frozen in stationary trays, as in a conventional household refrigerator, are not commercially saleable because the tops of the cubes are always uneven and the cubes are also objectionably white or cloudy due to the absence of agitation while the water is freezing. Another objection to such cubes is that they contain occluded salts and other impurities, which can only be avoided by constantly removing and replenishing the core water during the freezing operation.

For these and other reasons, nearly all the ice cubes which the trade supplies in large quantities to hotels, restaurants, etc., are made by subdividing large cakes of ice produced in commercial ice plants. In practice, a cake of ice weighing usually three hundred pounds is placed in a machine having a series of saws which saw the cake into approximately two thousand cubes. This process entails considerable expense due to the waste of about thirty percent of the ice from the cuts made by the saws, the labor required to handle the cakes of ice and the snow or "saw-dust" produced by the saws, and the repairs to the machine consisting chiefly in the replacement of the saws when they become dull or cracked.

In addition to the excessive cost of operating these cutting machines, is the poor quality of the ice cubes which they produce. The cubes are not regular in size due to the tapering sides and irregular tops of the cakes of ice from which they are cut, and more particularly due to the gradual wearing of the edges of the saws. Furthermore, the cubes sawed from the center of the ice cake are usually opaque or cloudy due to the presence of suspended matter and impurities which collect in the center of the cake because of their lower freezing point and where they are finally trapped and solidified with whatever air is present to form what is known in the trade as the "core" in the ice cake.

My invention overcomes the foregoing disadvantages of the prior art by providing a machine which automatically freezes ice cubes of uniform size with the surfaces forming perfect cubes of crystal clear ice. In the embodiment disclosed herein, my machine comprises a bucket or tank containing the raw water or other liquid to be frozen, and a revoluble carrier partially immersed in the liquid in the bucket and carrying a plurality of ice cube trays which repeatedly pass into and out of the water in the bucket as the carrier continues to rotate. The interior portions of the ice cube trays, comprising the spaces between the walls of the various ice cube compartments, are closed off from the bucket and contain the refrigerating medium or brine which is continuously circulated therethrough during the freezing operation. In the preferred embodiment of the invention the revoluble carrier has four rows or tiers of ice cube trays, which I have found to be more economical of space, cooling brine, motor power, etc. than any other possible arrangement of cube compartments.

According to a feature of the invention the outer faces of the various ice trays containing the ice cube compartments are adapted to be closed as by means of removable sliding doors which contain a plurality of apertures for the passage of water between the ice cube compartments and the bucket. When these doors are closed, during the freezing operation, they cover the various ice cube compartments and limit the level of the ice cubes formed therein, insuring the formation of flat square tops on the ice cubes, while at the same time the continuous agitation of the water in the cube compartments and the continuous replenishing of the water therein insures the formation of crystal-clear ice cubes. Upon the completion of the freezing operation the doors are removed, permitting the ice cubes to be discharged in a manner hereinafter described.

The only labor required to operate my machine is in filling the bucket with water, and when the water in the cube compartments is congealed (in less than one hour, depending upon the temperature of the refrigerant employed) in thawing off the cubes of ice by first draining the water from the bucket, admitting brine slightly above the freezing point of water to the interior portions of the ice cube trays, and removing the doors from the trays to permit the ice cubes to drop out of the machine as the carrier continues to revolve. Less than ten minutes time is required to empty the machine in this manner, replace the doors on the cube trays, refill the bucket with water, and change the valves to cut off the flow of brine above the freezing point of water and renew the flow of brine at a temperature below the freezing point of water to again start the freezing period.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the following description certain specific terms are used for convenience in referring to the various details of the invention. These terms, however, are to be interpreted as broadly as the state of the art will permit.

The apparatus illustrated herein by way of example includes an outer cylindrical housing or drum 1 composed of a semi-cylindrical bucket 2 and a semi-cylindrical cover 3 which is removably secured to said bucket as by wing nuts 4.

Figure 2:
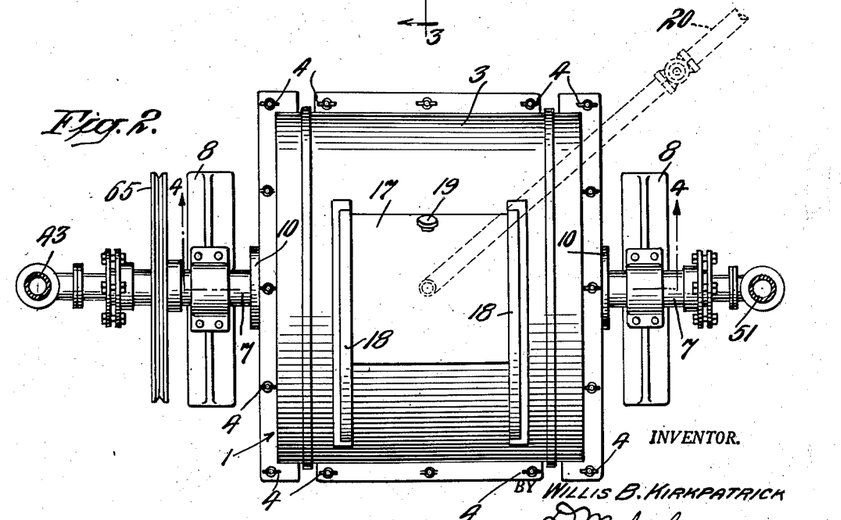
Fig. 2 is a top plan view thereof.
Figure 3:
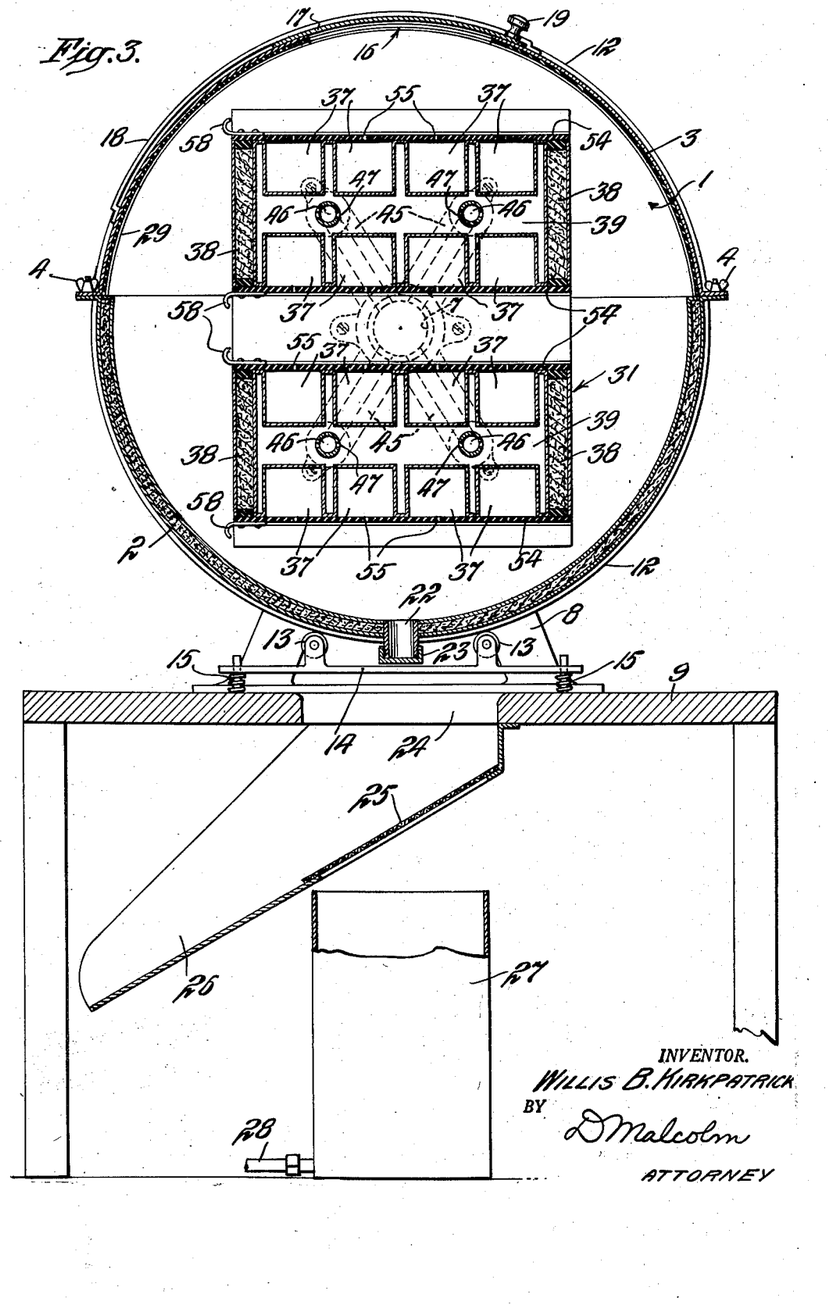
Fig. 3 is an enlarged transverse section taken on the line 3—3 of Fig. 1.
Figure 4:
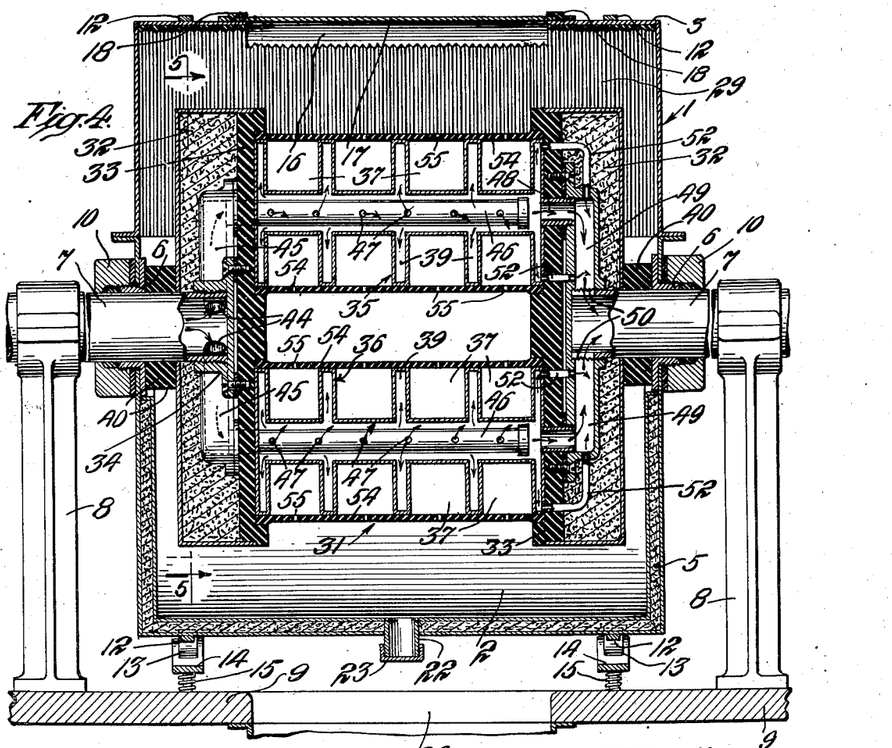
Fig. 4 is a longitudinal section taken on line 4—4 of Fig. 2.
Figure 5:
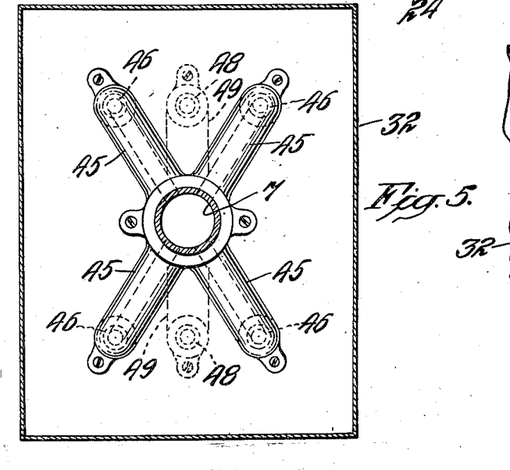
Fig. 5 is a transverse section taken on line 5—5 of Fig. 4.

The bucket 2, which preferably has its walls insulated at 5 as shown in Fig. 4, has end bearings 6 which are journaled on hollow stub shafts 7, and these stub shafts are rotatably mounted in standards 8 which are secured to the floor or platform 9, as shown in Figs. 1 to 4. Suitable stuffing glands 10 provide a seal between the bucket 2 and the revoluble stub shafts 7.

The outer walls of bucket 2 and cover 3 contain spaced semi-circular ridges which meet to form circular bands or tracks 12 when the cover is secured to the bucket as shown in Figs. 1 to 4, and these tracks 12 rest on rollers 13 carried by plates 14 which are resiliently supported on springs 15 on the platform 9. The rollers 13 thus support the cylindrical housing 1 and also facilitate rotation of said housing by hand, for a purpose hereinafter more fully described.

The cover 3 of cylindrical housing 1 has a central opening 16 which is closed by an arcuate sliding door 17 working in arcuate slots or tracks 18 on the outer surface of said cover and actuated by a handle 19, as shown in Figs. 1 to 4.

The raw water or other liquid to be frozen may be admitted to bucket 2, through opening 16 in cover 3, by means of a suitable hose or pipe 20, the door 17 in the cover being opened for this purpose and then closed before the machine is started in operation. The residue of water remaining in the bucket after the freezing operation is discharged through an outlet pipe 22 which is disposed in the center of the bucket and provided with a cap 23. The water issuing from outlet pipe 22 passes through an opening 24 in platform 9 and the wire screen surface 25 of an inclined chute 26 into a receptacle 27 from which it is drained through a pipe 28.

The cylindrical housing 1 remains in the upright position shown in Figs. 1 to 4 throughout the freezing operation, as will hereinafter more fully appear. However, at the conclusion of the freezing operation, after the residue of water has been drained from bucket 2 through outlet pipe 22, the entire housing 1 is rotated by hand until the sliding door 17 in cover 3 arrives opposite the opening 24 in platform 9. The sliding door 17 is then opened, and the ice cubes, having been freed from attachment to the machine by thawing as hereinafter described, will tumble through the opening 16 in cover 3 and slide down the inclined chute 26 to a conveyor or other collecting means. Inasmuch as there will be some dripping of water over the interior surface of the semi-cylindrical cover 3 when the ice cubes are discharged, I prefer to line this interior surface with a sheet 29 of rubber or other suitable water-resistant material having transverse grooves as illustrated in Fig. 4 to direct such water out through the opening 16 and into the receptacle 27.

The rotatable carrier 31 inside the cylindrical housing 1 comprises a pair of insulated end walls 32 of rectangular cross-section having inner plates 33 preferably composed of plastic insulating material which are fixedly secured to the rotatable stub shafts 7, the plate at the left of Fig. 4 being secured by a flanged sleeve 34. In the embodiment illustrated, a pair of spaced ice cube trays 35 and 36 are mounted parallel to each other on the inner end plates 33 of carrier 31. Each of these trays 35 and 36 is provided with a plurality of ice cube compartments 37 on opposite faces thereof, and the interior portions of said trays are closed off by the walls of the cube compartments and by side walls 38 to provide refrigerant chambers 39 for the circulation of a refrigerant about the interior walls of all the ice cube compartments 37, as shown in Figs. 3 and 4. Blocks 40 of insulating material surround the shafts 7 between the end walls 32 of the carrier and the end bearings 6 of the bucket 2.

Figure 1:
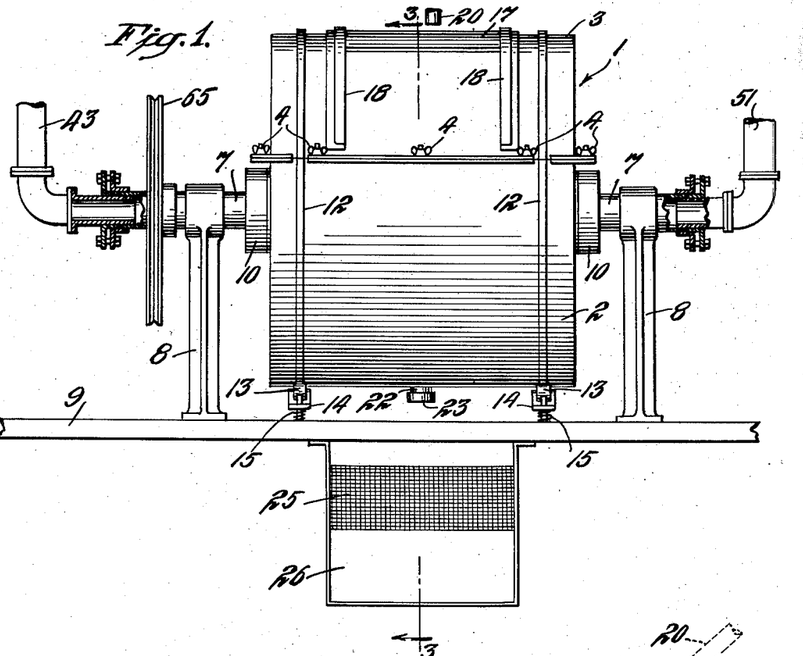
Fig. 1 is a front elevation of an ice cube-making machine embodying the invention.

The refrigerant which is circulated through the refrigerant chambers 39 enters the stub shaft 7 at the left of Figs. 1, 2, 4 and 6 through a pipe 43, as shown in Figs. 1 and 2. Inlet ports 44 in said stub shaft 7 convey the refrigerant to a plurality of branch conduits 45 which are secured to the flanged sleeve 34 within the insulated end wall 32 at the left of Fig. 4, and these branch conduits 45 are connected through the adjacent end plate 33 to horizontal distributing pipes 46 which extend through the refrigerant chambers 39 between the opposed banks of ice cube compartments 37 and are provided with a multiplicity of openings 47 for directing the refrigerant through all parts of the refrigerant chambers 39. In the embodiment illustrated, I have shown four branch conduits 45 and four distributing pipes 46, which I have found to insure a uniform steady flow of refrigerant to all parts of the refrigerant chambers, although the method and means for circulating the refrigerant may be varied as desired.

The refrigerant leaves the chambers 39 through two outlet openings 48 in the end plate 33 at the right of Fig. 4, and two branch conduits 49 which are secured to said plate 33 within the insulated end wall 32, passing thence through outlet ports 50 and stub shaft 7 at the right of Fig. 4 to the return pipe 51 of the circulatory system. In order to prevent the trapping of air in the refrigerant chambers 39 and thus insure the uniform flow of refrigerant to all parts of said chambers between the outer walls of all the ice cube compartments 37, small ducts 52 are connected between the branch conduits 49 and the extreme inner and outer ends of the refrigerant chambers 39 at the right of Fig. 4.

Figure 6:
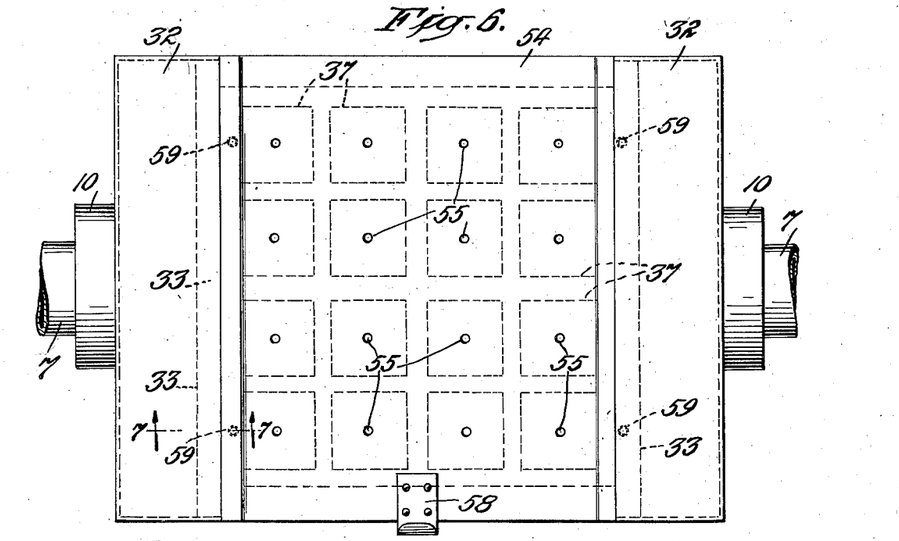
Fig. 6 is a top plan view of the rotatable carrier shown in Fig. 4.
Figure 7:
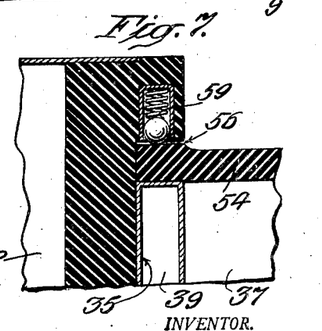
Fig. 7 is a detail section taken on line 7—7 of Fig. 6.

In order to limit the height of the ice cubes formed in the cube compartments 37 and insure the formation of flat square tops on said cubes, a removable sliding door 54 is provided on each exposed face of each of the ice cube trays 35 and 36 so that these doors, when closed, will cover the various ice cube compartments and permit water to flow into and out of said cube compartments only through holes or perforations 55 which are formed in said doors 54 in registry with the various cube compartments, as shown in Figs. 3, 4 and 6. Since in the embodiment illustrated there are four banks of ice cube compartments, or two banks of ice cube compartments to each of the two ice trays, there are a total of four slidable doors 54, as will be evident from Figs. 3 and 4. These doors 54 slide in channels 56 which are formed by shaping the insulating end plates 33 of the revoluble carrier 31 to overlie the extreme flat ends of the banks of cube compartments, as best shown in Fig. 7. The doors 54 are actuated by handles 58, and, in order to prevent possible dislodgement of the doors and hold the doors firmly against the cube compartments to close the latter, I provide spring-pressed buttons 59 in the end plates 33 which are adapted to yieldingly engage the faces of the doors with sufficient tension to seal the cube compartments, as best shown in Fig. 7. Assuming the cube compartments 37 to be filled with ice cubes which have just been thawed from the walls of said compartments so that they are ready to be released therefrom, such release may be accomplished by opening the arcuate door 17 in the cover 3 of housing 1, and then reaching into said housing and removing the slidable doors 54 one by one as the carrier 31 is slowly rotated, permitting the ice cubes to tumble out of the various compartments 37 by gravity when they arrive at an inverted position.

Figure 8:
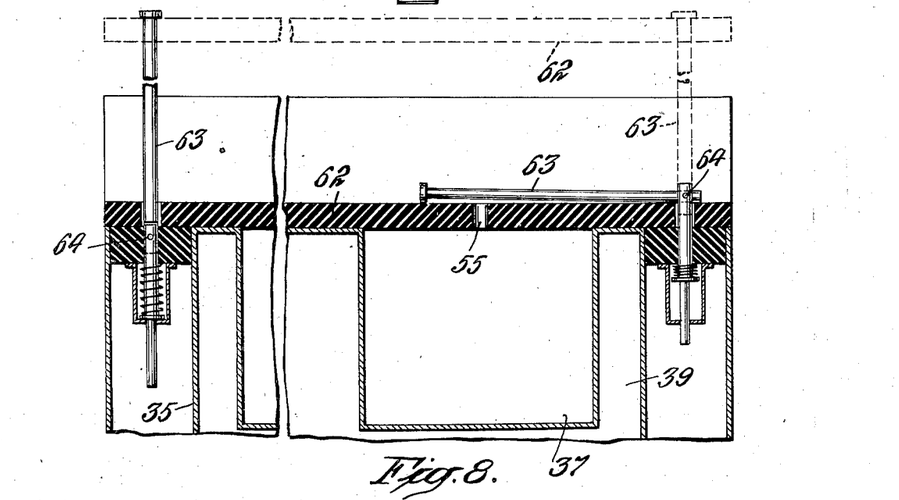
Fig. 8 is a longitudinal sectional view through one of the ice cube trays, illustrating a modification in the construction and operation of the door for closing the ice cube compartments.

Fig. 8 shows a modification in which, instead of the removable sliding doors of Figs. 1 to 7, I provide flat plates or doors 62 which are permanently attached to each exposed face of each ice cube tray by spring-pressed rods 63 which are jointed or pivoted at 64 so that they may either be folded over against the plates 62 to clamp same against the cube trays, or straightened out to form linear tracks or guides upon which the plates 62 may fall by gravity when they reach an inverted position to thereby release the ice cubes, the releasing position of plate 62 being indicated in dotted lines in Fig. 8.

In operation, the bucket 2 is filled to the desired level with the raw water to be frozen, the water usually reaching approximately to the level of the stub shafts 7. The arcuate door 17 in cover 3 is then closed. The refrigerant is then circulated in the manner described above and the carrier 31 is rotated as by means of a driving pulley 65 which is keyed to shaft 7 as shown in Figs. 1 and 2. Rotation may be in either a clockwise or counter-clockwise direction as viewed in Fig. 3.

As the carrier 31 rotates, the various banks of ice cube compartments 37 are carried into and out of the body of water in the bucket 2 and the water flows into and out of the cube compartments through the holes 55, according to the angular position of the trays. As rotation continues, the water in the cube compartments freezes progressively inwardly from the walls thereof, leaving a gradually diminishing pool of water in each partially formed ice cube. The level of the water in bucket 2 is low enough to cause these pools of water to flow out through the holes 55 and slop over into the bucket as each bank of cube compartments reaches an inclined position above such water level. The water, in freezing, throws off occluded salts and other impurities, so that these impurities are continuously discharged from the cube compartments as the gradually diminishing pools of water slop over into the bucket 2 during the continued rotation of the carrier.

The rotation of the carrier 31 causes the continuous agitation of the water in the bucket 2 and in the cube compartments 37, which results in the formation of clear ice without the use of aerating or stirring devices. The rotation of the carrier likewise insures adequate agitation of the refrigerant between the walls of the ice cube compartments as the refrigerant continues to circulate in the manner described above. The operation continues in the manner described until the completion of freezing, at which time the cubes are all uniformly frozen within their respective compartments.

Upon the completion of the freezing operation the cap 23 is removed from drain pipe 22 in bucket 2 and the residual water is drained into receptacle 27. Fresh water, at a somewhat higher temperature sufficient to thaw the seal between the sliding doors and the ice cubes, is admitted to the bucket through pipe 20, and this thawing water is drawn off through drain pipe 22 as soon as thawing is completed to allow the doors to be removed. The sliding doors 54 are then removed from the carrier 31 to uncover all of the ice cube compartments, as previously described. The entire cylindrical housing 1 is then rotated by hand on its rollers 13 and stub shafts 7 to bring the opening 16 of cover 3 (arcuate door 17 being open) into registry with the opening 24 in platform 9. It will be understood that even though housing 1 is journaled on the stub shafts 7 the rotation of said stub shafts during the operation of the machine does not cause the housing to rotate because the traction of the housing on its rollers 13, especially under the weight of the water in bucket 2, prevents such rotation, although means may be provided to lock the housing 1 against rotation if desired in any particular installation.

The temperature of the refrigerant circulating through the refrigerant chambers 39 is now raised sufficiently to thaw the seal between the compartments 37 and the ice cubes, permitting the cubes to fall by gravity into the inverted cover 3 of housing 1 as the carrier 31 continues to rotate, the freed cubes tumbling down the inclined chute 26 to any suitable collecting point, as previously described.

Figs. 9-12 illustrates a modification in the construction and operation of the removable sliding door 54. In this embodiment of the invention, the door 54 is provided with a plurality of square holes 66 which are positioned to over-lie the center of each ice cube compartment 37 when the door is closed, and the interior of each of said holes 66 is provided with a metal or other heat conductive lining 67. Experiments have demonstrated that of the many shapes of holes tested in my machine, the square hole with its surfaces parallel to the surfaces of the ice cube compartments 37, is better adapted for freezing clear ice with low temperature brine. Furthermore, the use of metal or other heat conductive liners 67 in the holes 66 results in a quicker thawing of the seal between the ice cubes and the under surface of the door 54 when the fresh thawing water is admitted to the bucket at the conclusion of the freezing operation.

In the embodiment of Figs. 9-12, furthermore, the rear portion of the upper surface of door 54 has a raised ledge or hood 68 which may be formed integral with the door 54. This ledge or hood 68 collects water from the bucket on the up-stroke of the revoluble carrier 31, so that this water will be deflected to flow over the surface of the cover 54 on the first quarter of the down stroke, thus insuring an adequate supply of water to the cube compartments during their entire cycle of rotation. Another advantage of the water-collecting member 68 is that in the thawing-off period it insures better contact with the thawing-water during the entire revolution of the carrier 31.

Figure 9:
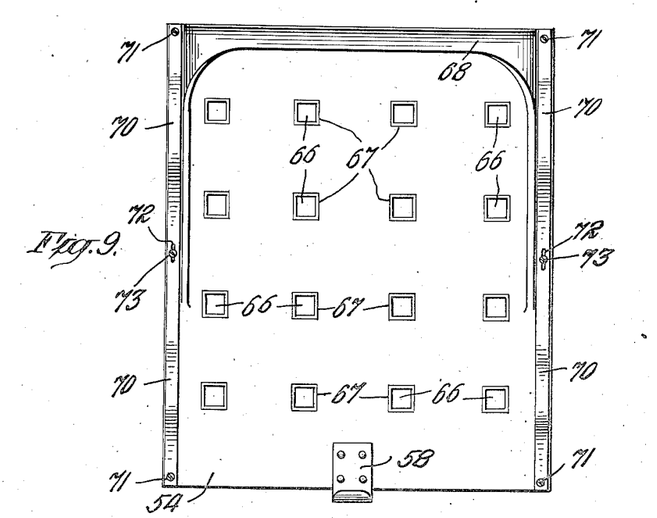
Fig. 9 is a top plan view illustrating another modification in the construction of the sliding door for the ice cube compartments.
Figure 10:
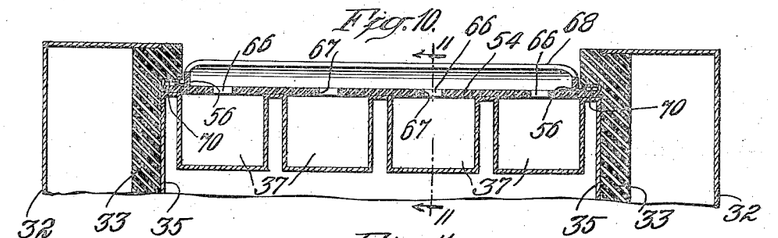
Fig. 10 is a longitudinal sectional view, taken on line 10—10 of Fig. 11, showing said door in closed position on one of the cube trays.
Figure 11:
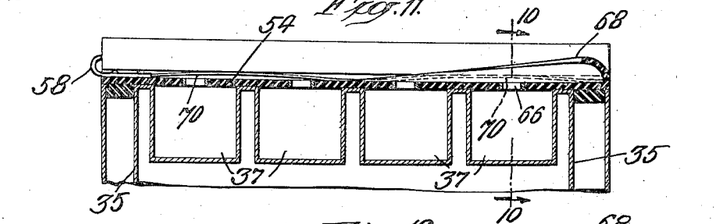
Fig. 11 is a transverse section taken on line 11—11 of Fig. 10.
Figure 12:
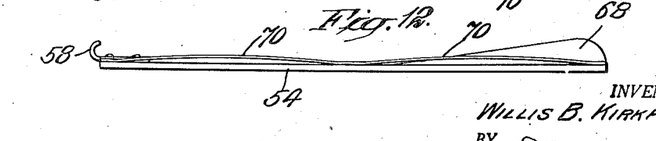
Fig. 12 is a side view of the door shown in Figs. 9–11.

Figs. 9-12 also show a modification of the means for securing the bottom surface of the cover 54 to the top surface of the cube compartments 37, and for facilitating the removal of the door after the thawing of the seal between the door and the ice cubes. The channels 56 in the insulating end plates 33 of carrier 31, in which the doors 54 are adapted to slide, are made substantially deeper than the thickness of the door 54 which slides therein, as best shown in Fig. 10. Flat strips 70 of spring metal or other resilient material are secured to the upper side edges of door 54 as by screws 71. These leaf springs are provided with intermediate slots 72 through which pins 73 extend, and the springs 70 are bowed outwardly between their respective ends and the retaining pins 73 as best shown in Figs. 9 and 12. Accordingly, the peaks of the arched or bowed portions of the springs 70 will be compressed when the cover 54 is inserted in the channels 56, thus holding the cover 54 securely against the tops of the ice cube compartments 37. However, at the conclusion of the freezing operation the door 54 is easily removed by grasping the handle 58 and tipping or canting the door upon the spring strips 70, thus facilitating the breaking of the seal of ice between the cover 54 and the tops of the ice cubes.

It will be understood that the number and arrangement of the ice cube trays and compartments may be varied widely to suit individual requirements, and that batteries of several or many carriers 31 may be connected in series in a common housing 1, or in separate housings mounted in alignment, or in any other suitable manner, according to production requirements.

It will also be evident to those skilled in the art that various other changes may be made in the details of construction and methods of operation described herein without departing from the scope and spirit of the invention as defined in the appended claims.

The invention claimed is:

1. Apparatus for making ice cubes comprising a housing adapted to contain a liquid to be frozen, means rotatably supporting said housing, means for draining the liquid from said housing, means for discharging ice cubes from said housing upon rotation of said housing to discharging position, a revoluble carrier in said housing, a plurality of ice cube compartments on said carrier adapted to pass repeatedly into and out of the liquid in said housing during rotation of said carrier, the interior portions of said ice cube compartments being closed off from said housing and forming a chamber for the circulation of a refrigerant about said compartments, doors closing said ice cube compartments to limit the level of the ice cubes formed therein and adapted to be opened to permit the discharge of ice cubes from said compartments, said doors, containing apertures for the passage of liquid between said ice cube compartments and said housing, means for rotating said carrier, and means for circulating a refrigerant through said refrigerant chamber.

2. Apparatus for making ice cubes comprising a bucket adapted to contain a liquid to be frozen, a cover cooperating with said bucket to form a housing, means rotatably supporting said housing, means for draining liquid from said bucket, means for discharging ice cubes from said housing upon rotation of said housing to discharging position, a revoluble carrier in said housing, a plurality of ice cube compartments on said carrier adapted to pass repeatedly into and out of the liquid in said bucket during rotation of said carrier, the interior portions of said ice cube compartments being closed off from said housing and forming a chamber for the circulation of a refrigerant about said compartments, doors closing said ice cube compartments to limit the level of the ice cubes formed therein and adapted to be opened to permit the discharge of ice cubes from said compartments, said doors containing apertures for the passage of liquid between said ice cube compartments and said bucket, means for rotating said carrier, and means for circulating a refrigerant through said refrigerant chamber.

3. Apparatus for making ice cubes comprising a bucket adapted to contain a liquid to be frozen, a cover cooperating with said bucket to form a housing, means rotatably supporting said housing, means for draining liquid from said bucket, means for discharging ice cubes from said housing upon rotation of said housing to discharging position, a revoluble carrier in said housing, spaced ice trays on said carrier each containing a plurality of ice cube compartments on opposite faces thereof adapted to pass repeatedly into and out of the liquid in said bucket during rotation of said carrier, the interior portions of said ice trays being closed off from said housing and forming chambers for the circulation of a refrigerant about said ice cube compartments, doors on said ice trays adapted when closed to cover the various ice cube compartments to limit the level of the ice cubes formed therein and adapted when open to permit the discharge of ice cubes from said compartments, said doors containing apertures for the passage of liquid between said ice cube compartments and said bucket, means for rotating said carrier, and means for circulating a refrigerant through said refrigerant chambers.

4. Apparatus for making ice cubes comprising a bucket adapted to contain a liquid to be frozen, a cover cooperating with said bucket to form a housing, means rotatably supporting said housing including a plurality of rollers, tracks on said housing cooperating with said rollers to support said housing and facilitate rotation thereof, means for draining liquid from said bucket, means for discharging ice cubes from said housing upon rotation of said housing to discharging position, a revoluble carrier in said housing, spaced ice trays on said carrier each containing a plurality of ice cube compartments on opposite faces thereof adapted to pass repeatedly into and out of the liquid in said bucket during rotation of said carrier, the interior portions of said ice trays being closed off from said housing and forming chambers for the circulation of a refrigerant about said ice cube compartments, doors on said ice trays adapted when closed to cover the various ice cube compartments to limit the level of the ice cubes formed therein and adapted when open to permit the discharge of ice cubes from said compartments, said doors containing apertures for the passage of liquid between said ice cube compartments and said bucket, means for rotating said carrier, and means for circulating a refrigerant through said refrigerant chambers.

5. Apparatus for making ice cubes comprising a bucket adapted to contain a liquid to be frozen, a cover cooperating with said bucket to form a housing, means rotatably supporting said housing including a plurality of rollers, tracks on said housing cooperating with said rollers to support said housing and facilitate rotation thereof, means for draining liquid from said bucket, means for discharging ice cubes from said housing to discharging position, an inclined screen beneath said housing for discharging liquid through said screen and guiding ice cubes over said screen to a collecting point, a revoluble carrier in said housing, spaced ice trays on said carrier each containing a plurality of ice cube compartments on opposite faces thereof adapted to pass repeatedly into and out of the liquid in said bucket during rotation of said carrier, the interior portions of said ice trays being closed off from said housing and forming chambers for the circulation of a refrigerant about said ice cube compartments, doors on said ice trays adapted when closed to cover the various ice cube compartments to limit the level of the ice cubes formed therein and adapted when open to permit the discharge of ice cubes from said compartments, said doors containing apertures for the passage of liquid between said ice cube compartments and said bucket, means for rotating said carrier, and means for circulating a refrigerant through said refrigerant chambers.

6. Apparatus for making ice cubes comprising a semi-cylindrical bucket adapted to contain a liquid to be frozen, a semi-cylindrical cover cooperating with said bucket to form a cylindrical housing, means rotatably supporting said housing including a plurality of rollers, tracks on said housing cooperating with said rollers to support said housing and facilitate rotation thereof, means for draining liquid from said bucket, means in said housing for discharging ice cubes upon rotation of said housing on said rollers to discharging position, an inclined screen beneath said housing for discharging liquid through said screen and guiding ice cubes over said screen to a collecting point, a revoluble carrier in said housing, spaced parallel ice trays on said carrier each containing a plurality of ice cube compartments on opposite parallel faces thereof adapted to pass repeatedly into and out of the liquid in said bucket during rotation of said carrier, the interior portions of said ice trays being closed off from said housing and forming chambers for the circulation of a refrigerant about said ice cube compartments, doors on the faces of said ice trays adapted when closed to cover the various ice cube compartments to limit the level of the ice cubes formed therein and adapted when open to permit the discharge of ice cubes from said compartments, said doors containing apertures for the passage of liquid between said ice cube compartments and said bucket, means for rotating said carrier, and means for circulating a refrigerant through said refrigerant chambers.

7. Apparatus for making ice cubes comprising a semi-cylindrical bucket adapted to contain a liquid to be frozen, a semi-cylindrical cover cooperating with said bucket to form a cylindrical housing, bearings rotatably supporting said housing, a support for said housing including a plurality of rollers, circular tracks on said housing resting on said rollers to support said housing and facilitate rotation thereof, means including an opening in said bucket for draining the liquid therefrom, an arcuate door on said cover for discharging ice cubes by gravity upon rotation of said housing on said rollers to discharging position, an inclined screen beneath said housing for discharging liquid through said screen and guiding ice cubes over said screen to a collecting point, a revoluble carrier in said housing, a pair of spaced parallel ice trays on said carrier each containing a plurality of ice cube compartments on opposite parallel faces thereof adapted to pass repeatedly into and out of the liquid in said bucket during rotation of said carrier, the interior portions of said ice trays being closed off from said housing and forming chambers for the circulation of a refrigerant about said ice cube compartments, removable sliding doors on the faces of said ice trays adapted when closed to cover the various ice cube compartments to limit the level of the ice cubes formed therein and adapted when removed to permit the discharge of ice cubes from said compartments, said sliding doors containing apertures for the passage of liquid between said ice cube compartments and said bucket, means for rotating said carrier, and means for circulating a refrigerant through said refrigerant chambers.

8. Apparatus for making ice cubes comprising a semi-cylindrical bucket adapted to contain a liquid to be frozen, a semi-cylindrical cover cooperating with said bucket to form a cylindrical housing, bearings rotatably supporting said housing, a support for said housing including a plurality of rollers, circular tracks on said housing resting on said rollers to support said housing and facilitate rotation thereof, means including an opening in said bucket for draining the liquid therefrom, an arcuate door on said cover for discharging ice cubes by gravity upon rotation of said housing on said rollers to discharging position, an inclined screen beneath said housing for discharging liquid through said screen and guiding ice cubes over said screen to a collecting point, a revoluble carrier in said housing, a pair of spaced parallel ice trays on said carrier on each containing a plurality of ice cube compartments on opposite parallel faces thereof adapted to pass repeatedly into and out of the liquid in said bucket during rotation of said carrier, the interior portions of said ice trays being closed off from said housing and forming chambers for the circulation of a refrigerant about said ice cube compartments, removable sliding doors on the faces of said ice trays adapted when closed to cover the various ice cube compartments to limit the level of the ice cubes formed therein and adapted when removed to permit the discharge of ice cubes from said compartments, said sliding doors containing apertures for the passage of liquid between said ice cube compartments and said bucket, a rotatable shaft supporting said carrier and containing a passage communicating with said refrigerant chambers for the circulation of the refrigerant therein, means for rotating said shaft, and means for circulating a refrigerant through said passage and said chambers.

9. Apparatus for making ice cubes comprising a housing adapted to contain a liquid to be frozen, means rotatably supporting said housing, means for draining the liquid from said housing, means for discharging ice cubes from said housing upon rotation of said housing to discharging position, a revoluble carrier in said housing, a plurality of ice cube compartments on said carrier adapted to pass repeatedly into and out of the liquid in said housing during rotation of said carrier, the interior portions of said ice cube compartments being closed off from said housing and forming a chamber for the circulation of a refrigerant about said compartments, doors, closing said ice cube compartments to limit the level of the ice cubes formed therein and adapted to be opened to permit the discharge of ice cubes from said compartments, said doors containing apertures for the passage of liquid between said ice cube compartments and said housing, linings of heat conductive material in said apertures, means for rotating said carrier, and means for circulating a refrigerant through said refrigerant chamber.

10. Apparatus for making ice cubes comprising a housing adapted to contain a liquid to be frozen, means rotatably supporting said housing, means for draining the liquid from said housing, means for discharging ice cubes from said housing upon rotation of said housing to discharging position, a revoluble carrier in said housing, a plurality of ice cube compartments on said carrier adapted to pass repeatedly into and out of the liquid in said housing during rotation of said carrier, the interior portions of said ice cube compartments being closed off from said housing and forming a chamber for the circulation of a refrigerant about said compartments, removable sliding doors closing said ice cube compartments to limit the level of the ice cubes formed therein and adapted when removed to permit the discharge of ice cubes from said compartments, said doors containing apertures for the passage of liquid between said ice cube compartments and said housing, means on said doors for collecting liquid from said housing and directing same over said apertures during rotation of said carrier, means for rotating said carrier, and means for circulating a refrigerant through said refrigerant chamber.

11. Apparatus for making ice cubes comprising a housing adapted to contain a liquid to be frozen, means rotatably supporting said housing, means for draining the liquid from said housing, means for discharging ice cubes from said housing upon rotation of said housing to discharging position, a revoluble carrier in said housing, a plurality of ice cube compartments on said carrier adapted to pass repeatedly into and out of the liquid in said housing during rotation of said carrier, the interior portions of said ice cube compartments being closed off from said housing and forming a chamber for the circulation of a refrigerant about said compartments, removable sliding doors closing said ice cube compartments to limit the level of the ice cubes formed therein and adapted when removed to permit the discharge of ice cubes from said compartments, said doors containing apertures for the passage of liquid between said ice cube compartments and said housing, spring means on said doors holding same against said cube compartments and permitting the canting of said doors to facilitate removal thereof, means for rotating said carrier, and means for circulating a refrigerant through said refrigerant chamber.

12. Apparatus for making ice cubes comprising a housing adapted to contain a liquid to be frozen, means rotatably supporting said housing, means for draining the liquid from said housing, means for discharging ice cubes from said housing upon rotation of said housing to discharging position, a revoluble carrier in said housing, a plurality of ice cube compartments on said carrier adapted to pass repeatedly into and out of the liquid in said housing during rotation of said carrier, the interior portions of said ice cube compartments being closed off from said housing and forming a chamber for the circulation of a refrigerant about said compartments, removable sliding doors closing said ice cube compartments to limit the level of the ice cubes formed therein and adapted when removed to permit the discharge of ice cubes from said compartments, said doors containing apertures for the passage of liquid between said ice cube compartments and said housing, leaf springs on the edges of said doors bowed to resiliently hold said doors against said cube compartments and permitting the canting of said doors to facilitate removal thereof, means for rotating said carrier, and means for circulating a refrigerant through said refrigerant chamber.

WILLIS B. KIRKPATRICK.